United States Patent [19]
Doerr et al.

[11] Patent Number: 5,949,411
[45] Date of Patent: Sep. 7, 1999

[54] REMOTE INTERACTIVE MULTIMEDIA PREVIEW AND DATA COLLECTION KIOSK SYSTEM

[75] Inventors: Phillip M. J. Doerr, Potomac, Md.; Christophe Lefebvre, Great Falls; Greg M. Walker, Springfield, both of Va.

[73] Assignee: Cyber Marketing, Inc.

[21] Appl. No.: 08/972,336

[22] Filed: Nov. 18, 1997

Related U.S. Application Data

[63] Continuation of application No. 08/602,879, Feb. 16, 1996, abandoned.
[51] Int. Cl.$^6$ .................................................... G06T 1/00
[52] U.S. Cl. ...................................... 345/327; 395/200.49
[58] Field of Search ..................................... 345/329, 333, 345/353, 302, 327; 395/200.33, 200.49, 200.47, 200.48; 348/7, 8; 455/4.1, 4.2; 705/26, 27

[56] References Cited

U.S. PATENT DOCUMENTS

| | | |
|---|---|---|
| Re. 34,915 | 4/1995 | Nichtberger et al. . |
| 4,449,198 | 5/1984 | Kroon et al. . |
| 4,553,222 | 11/1985 | Kurland et al. . |
| 4,674,041 | 6/1987 | Lemon et al. . |
| 4,712,191 | 12/1987 | Penna . |
| 4,723,212 | 2/1988 | Mindrum et al. . |
| 4,740,912 | 4/1988 | Whitaker ................................ 395/353 |
| 4,766,581 | 8/1988 | Korn et al. . |
| 4,814,972 | 3/1989 | Winter et al. . |
| 4,896,791 | 1/1990 | Smith . |
| 4,910,672 | 3/1990 | Off et al. . |
| 4,924,303 | 5/1990 | Brandon et al. . |
| 5,132,992 | 7/1992 | Yurt et al. . |
| 5,173,851 | 12/1992 | Off et al. . |
| 5,237,157 | 8/1993 | Kaplan . |
| 5,239,480 | 8/1993 | Huegel . |

(List continued on next page.)

OTHER PUBLICATIONS

Georgianis, Maria V. "Wide Range Of Software Sellers Creates Niche For Kiosks." *Computer Retail Week* vol. 5, No. 114 (Oct. 9, 1995), p. 34.

Bandrowski, Paul. "Stores Without Doors: Kiosks Generate New Profits" *Corporate Computing* vol. 1, No. 4 (Oct. 1992), pp. 193–195.

Terdoslavich, Wiliam, "Bottling A Vintage Solution: Many Organizations Are Turning To Multimedia Kiosks To Sell and Inform" *Computer Reseller News* No. 595 (Aug. 22, 1994), pp. S19–20.

Steinberg, Don. "McKesson Data Kiosks Build Business For Its Consumers" *PC Week* vol. 5, No. 10 (Mar. 8, 1988), pp. C1–2.

Weiss, Jiri. "Multimedia Hits The Streets" *Newmedia* vol. 5, No. 2 (Feb. 1995), pp. 44–49.

KioSurf Internet Kiosk Software, http://ww.kiosruf.com/netshift.html., Mar. 1999.

Malisow, "News: Take that, Ticketmaster!", http.//www.lasvegasweekly.com/departments/12_30_98/news_etm-.html, Dec. 1998.

"CySource, Inc. Brings Video–On–Demand to Great Mall", Internet News Bureau, http://newsbureau.com/archives/Jul.98/cysource.htm.

*Primary Examiner*—Joseph H. Feild
*Attorney, Agent, or Firm*—Dennis H. Lambert, Esq.

[57] ABSTRACT

A system for previewing movies, videos, music, and other events, has a host data processing network connected via modem with one or more media companies and with one or more remote kiosks to transmit data between the media companies and the kiosks, so that the data can be accessed by users at the remote kiosks. A touch screen and user-friendly graphics encourage use of the system. Video images, graphics and other data received from the media companies are suitably digitized, compressed, and otherwise formatted by the host for use at the kiosk. This enables movies, videos, music and special events to be previewed at strategically located kiosks, and the data can be updated or changed, as desired, from the host.

26 Claims, 6 Drawing Sheets

U.S. PATENT DOCUMENTS

| | | | |
|---|---|---|---|
| 5,276,866 | 1/1994 | Paolini . | |
| 5,305,197 | 4/1994 | Axler et al. . | |
| 5,339,239 | 8/1994 | Manabe et al. . | |
| 5,347,632 | 9/1994 | Filepp et al. . | |
| 5,350,303 | 9/1994 | Fox et al. . | |
| 5,355,302 | 10/1994 | Martin et al. . | |
| 5,379,421 | 1/1995 | Palazzi, III et al. . | |
| 5,408,417 | 4/1995 | Wilder . | |
| 5,418,713 | 5/1995 | Allen | 395/232 |
| 5,422,674 | 6/1995 | Hooper et al. . | |
| 5,423,003 | 6/1995 | Berteau . | |
| 5,440,699 | 8/1995 | Farrand et al. . | |
| 5,442,389 | 8/1995 | Blahut er al. . | |
| 5,515,492 | 5/1996 | Li et al. . | |
| 5,553,221 | 9/1996 | Reimer et al. . | |
| 5,572,643 | 11/1996 | Judson . | |
| 5,596,705 | 1/1997 | Riemer et al. . | |
| 5,621,456 | 4/1997 | Florin et al. | 348/7 |
| 5,625,864 | 4/1997 | Budow et al. | 455/4.2 |
| 5,737,747 | 4/1998 | Vishlitzky et al. | 711/118 |
| 5,745,710 | 4/1998 | Clanton, III et al. | 345/327 |
| 5,808,662 | 9/1998 | Kinney et al. | 348/15 |
| 5,818,512 | 10/1998 | Fuller | 348/8 |
| 5,838,314 | 11/1998 | Neel et al. | 345/327 |

REMOTE INTERACTIVE MULTIMEDIA PREVIEW AND DATA COLLECTION KIOSK SYSTEM

RELATED APPLICATIONS

This application is a continuation of application Ser. No. 08/602,879, filed Feb. 16, 1996, now abandoned.

BACKGROUND OF THE INVENTION

1. Field Of The Invention:

This invention relates generally to a system and method for previewing movies, music, video tapes, special events, and the like. More particularly, the invention relates to such a system and method in which data related to the media to be previewed is transmitted from one or more media companies to a host processing station where the data is formatted, as desired, and then transmitted by the host to remote kiosks for interactive user access.

2. Description Of The Prior Art

Technology for dissemination and collection of information has evolved dramatically in recent years, due at least in part to the advent of more powerful and compact computers, and the development of sophisticated software and telecommunications devices. This evolution in the dissemination and collection of information has also affected the way in which goods and services are marketed.

Some companies market their goods and services by using this technology to provide interactive promotional displays. For instance, music stores and video rental stores have implemented point of sale display booths which incorporate CD-ROM devices to store and play segments of video games and/or music as a means of stimulating the interest of consumers in these products, and to enable the consumer to preview the product before a purchase is made. Proposals have also been made to use this technology to enable remote programming of jukeboxes, i.e., new music selections are transmitted electronically from a host computer to remote jukebox terminals, thereby eliminating the necessity of manually changing music selections in the jukeboxes. Governmental agencies have also used this new technology as a means of disseminating information relating to the services and functions of the agencies, and as a means of collecting data from the public.

A wide variety of information is also accessible through various on-line services. For instance, individuals can use telecommunications to access and listen to music selections or to order and download data, including videos, onto their personal computers.

However, the motion picture industry still promotes its films largely through previews of coming attractions played just prior to the showing of the feature film in a theater. Previews or trailers of coming attractions are also played periodically on television, and newspaper and magazine ads are extensively used as a means of stimulating the interest of consumers in the purchase of tickets to view the films. These conventional methods of previewing and/or promoting motion pictures are limited in that they are displayed only in theaters to an audience that is already in attendance at the theater, or to persons viewing television, or are capable of imparting only limited information. Moreover, the consumer has no choice in the selection of previews and other information offered, nor is there any interactive capability.

Similarly, the CD-ROM technology previously utilized for enabling consumers to sample video and music selections has required the prerecording of selected materials onto CDs, which then must be physically placed in the kiosk facility which the consumer uses to access the information. Thus, it is necessary to replace the CD whenever it is desired to update the information being offered. Various on-line systems for sampling of music selections require access to an on-line service. These systems also offer very little opportunity for customizing the information disseminated or collected, and have relatively fixed formats.

Accordingly, there is need for a system and method for disseminating information to the public, and collecting data, by using electronic transmission of the data between a host terminal and remote terminals, so that information contained in the remote terminals can be updated, as desired, without the need for physically visiting the terminals, and so that the information contained in the remote terminals can be accessed by the user through an interactive GUI, without requiring access to an on-line service. Especially desirable is a system and method for enabling motion pictures to be previewed at remote locations and in a way that enables the user to select the films to be previewed and further provides a choice of other information relating to the film, all of which should preferably be available through a user-friendly graphical user interface (GUI).

SUMMARY OF THE INVENTION

In contrast to the relatively rigid formats and requirements of conventional systems and methods for disseminating and collecting information, e.g., for sampling and previewing music, videos and special events, and particularly movies, the present invention provides a unique system and method which makes optimal use of existing technology to provide great flexibility and ease of use to the consumer as well as to those companies desiring to promote their goods and services. Further, the system of the invention does not require the consumer to possess a personal computer, or to subscribe to an on-line service.

The system of the invention provides one or more computer terminals in kiosks in remote, strategic locations, able to communicate electronically (e.g., via telephone lines) with a host data processor that collects and processes data from one or more media companies and then provides the data to the remote kiosks for interactive access by a user. In addition, data related to the user and/or to the product or service being accessed by the user may be collected at the kiosk and gathered by the host processor for generation of reports that can then, e.g., be provided to the media companies. Of particular novelty is the system and method provided by the invention for previewing movies or motion pictures. With the invention, a consumer can use one of the strategically located kiosks for selective preview of desired films and for obtaining other data related to the film, such as a schedule of times and places where the film can be seen, reviews of the film, the story line of the film, and movie credits. The system of the invention enables the user to select any of these categories, as desired, or to interrupt at any time a selected category and choose another one. The interactive GUI further enables the user to rate the film and this data can be retrieved by the host server for use by the film companies which produced and/or distributed the film. Similar information related to videos, music and special events can also be obtained by the user, and related data collected by the host.

The system of the invention utilizes one or more computers in a host network, coupled in a preferred embodiment with one or more media companies and with the remote kiosks by one or more high speed modems. It should be understood, however, that connection between the media companies, the host network and the remote kiosks can be accomplished by other means, such as satellite relay, microwave transmission, etc. Information provided by the media companies to the host network can also be transmitted by mail, although in this event it will be necessary for the host network to process the raw video and/or graphic data and put it into proper format for transmission to the remote kiosks and appropriate use at the kiosks.

The host network includes at least one computer which communicates with the media companies and with the remote kiosks via modem, and in a preferred embodiment has at least one computer system that is duplicative of the computer system located in the remote kiosks, so that conditions at the kiosk can be exactly duplicated at the host for test of the performance of the system at the kiosks. Upon receipt of the data from the media companies and processing of the data, as appropriate, the data is loaded into master data files prior to being transmitted to the kiosks. The system of the invention is menu driven, and the user interface at the kiosk relies upon a user-friendly touch screen and graphics.

It is contemplated that one or more host systems will be provided, each communicating with all of the kiosks in that system. However, it is possible that the host could communicate with a first level of kiosks which, in turn, could communicate with a second level of kiosks, which could then communicate with a third level, etc. In other words, a pyramid scheme could be utilized to maximize the efficiency of distribution of information and collection of data between the host network and kiosks, especially when a large number of kiosks are involved.

BRIEF DESCRIPTION OF THE DRAWINGS

The foregoing, as well as other objects and advantages of the invention, will become apparent from the following detailed description when considered in conjunction with the accompanying drawings, wherein like reference characters designate like parts throughout the several views, and wherein.

DETAILED DESCRIPTION OF THE PREFERRED EMBODIMENTS

Figure 1:
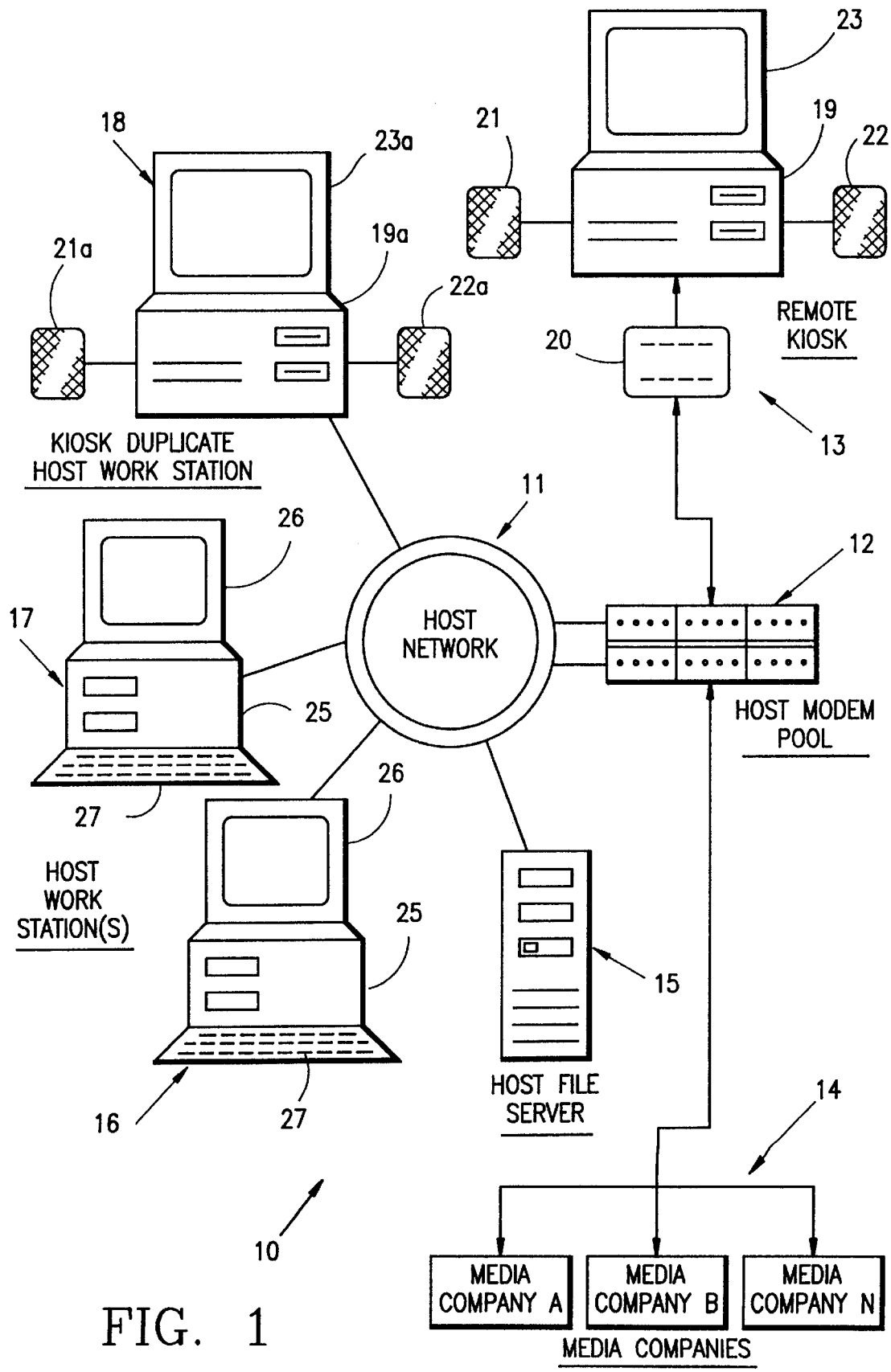
FIG. 1 is a schematic diagram of the basic hardware configuration of the invention.

Referring more particularly to the drawings, the basic hardware configuration of a preferred embodiment of the invention is indicated generally at 10 in FIG. 1. In this embodiment a host processor network 11 is connected via a modem pool 12 with at least one remote kiosk 13 and with one or more media companies 14.

The host network includes at least one primary processor or file server 15 connected via the modem pool 12 with the remote kiosks 13 and with the media company or companies 14. Additionally, the host network preferably includes one or more host work stations 16, 17, 18, etc. which process the raw data received by the host and place it in a format usable by the system. Each remote kiosk 13 includes at least one processor 19 connected via a modem 20 with the host modem pool 12, one or more speakers 21 and 22, and a touch screen display monitor 23 which provides an interface between the kiosk processor and a user.

In the preferred embodiment, at least one of the work stations 18 at the host network is essentially a duplicate of the remote kiosk terminal and includes a processor 19a, speakers 21a and 22a, and a touch screen 23a that are identical to those used at the remote kiosk. This enables the kiosk operation to be duplicated at the host for testing the performance of the remote kiosk. The graphic work stations 16, 17, etc., each includes a processor 25, monitor 26 and keyboard or mouse or other control device 27. These work stations are used to process raw data received by the host.

The host file server preferably comprises a 133 megahertz Pentium or equivalent processor with at least a 1.2 and preferably 2–3 gigabyte hard drive, at least 16 and preferably 32 megabytes of RAM, and a 4 megabyte VRAM graphics accelerator card. In addition, a high speed video capture board, such as Fast Electronics FPS 60 with an MPEG video compression extension, is employed. The host modem pool 12 preferably comprises several modems rated at least at 28.8 bps, such as Hayes Accura 28.8 V 0.34 external fax modems.

A suitable scanner 28 is connected with the host network for scanning text, graphics, photographs, and the like into one of the host processors. One suitable example of an appropriate scanner is a Mustek flatbed scanner, Model MSS-600CX with 1200 dpi, driven by Adobe Premier Indeo software.

The host graphic work stations 16, 17, etc., each preferably utilize a Pentium or equivalent processor 25 operating at 133 megahertz clock speed and having 16 megabytes of RAM, at least 850 megabytes and preferably at least 1.2 gigabytes of memory in the hard drive, a four megabyte VRAM graphics accelerator card, and a 20 inch Mitsubishi or Goldstar Diamond Scan touch screen monitor, or equivalent. It should be understood that other suitable specifications could be utilized as desired or necessary.

Each remote kiosk system 13 also preferably utilizes a Pentium or equivalent processor 25 operating at 133 megahertz clock speed and having 16 megabytes of RAM, at least 850 megabytes and preferably at least 1.5 gigabytes of memory in the hard drive, a four megabyte VRAM graphics accelerator card, and a 20 inch Mitsubishi or Goldstar Diamond Scan touch screen monitor. It should be understood, however, that other suitable specifications could be utilized as desired or necessary.

The speakers 21a and 22a may comprise 80 watt Hi-Fi compact stereo speakers, although a different configuration could be employed if desired. The remote kiosk modem 20 may comprise a Hayes Accura 28.8 V 0.34 external fax modem, or equivalent.

It should be noted that the host file server 15 has scalable components and is therefore not locked into any particular configuration. Moreover, the entire system is database driven, i.e., a descriptive name is given to each major file, and the program can therefore remain static, with changes being made to the databases, as necessary or desirable. For example, each database could have 40 different items or files.

Figure 2:
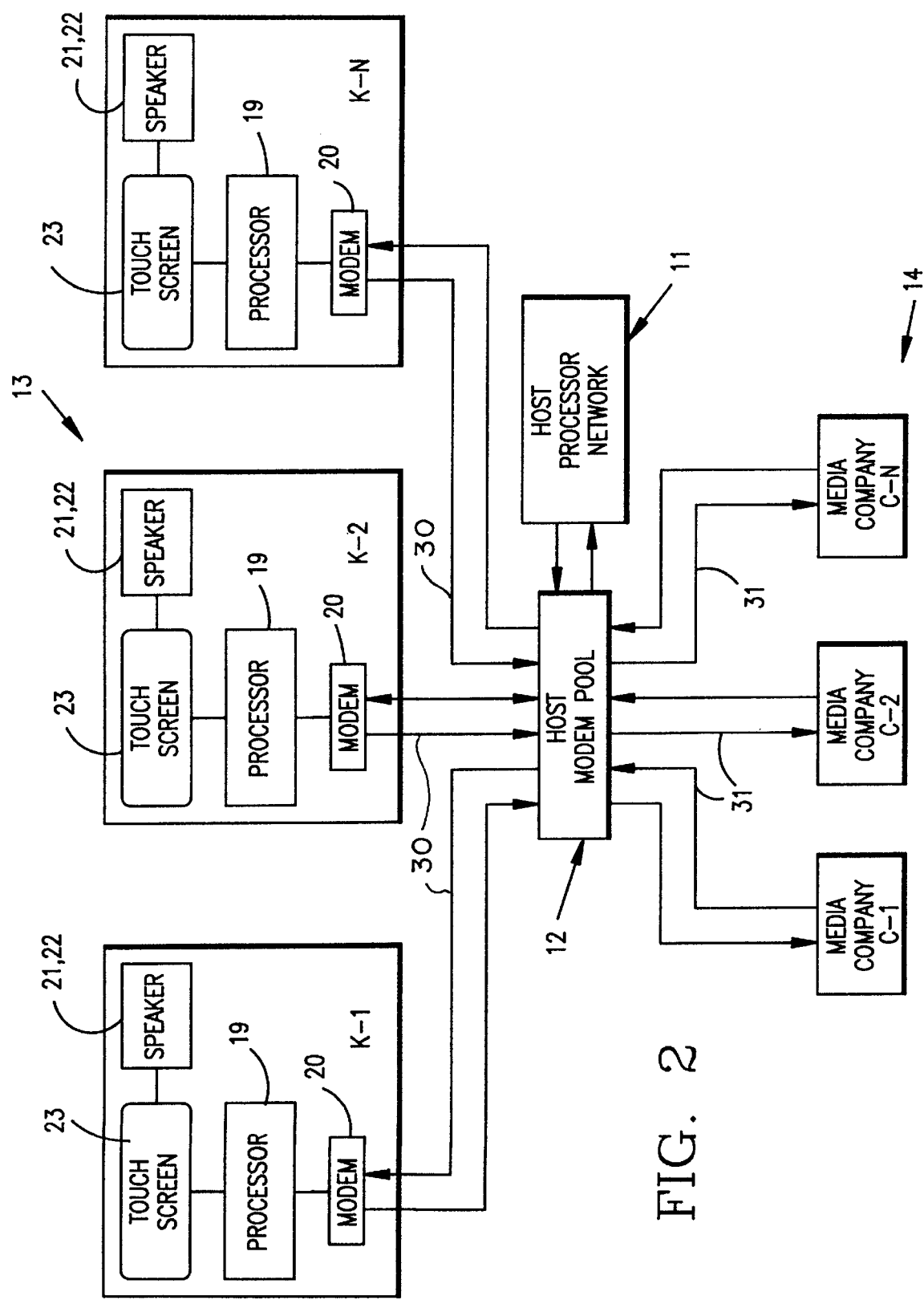
FIG. 2 is a schematic diagram of the general hardware design layout thereof.

With reference to FIG. 2, and as noted previously, the kiosk system 13 includes one or more kiosk stations K-1 through K-N, as desired, each including a processor 19, modem 20, speakers 21 and 22 and a touch screen 23. The kiosks are connected with the host modem pool 12 via telecommunications facilities 30 for transfer of data between the kiosks and the host network.

Similarly, and as previously noted, the host network may be connected with one or more media companies C-1 through C-N for transfer of data between the host network and the media companies via appropriate telecommunications facilities 31.

Figure 3:
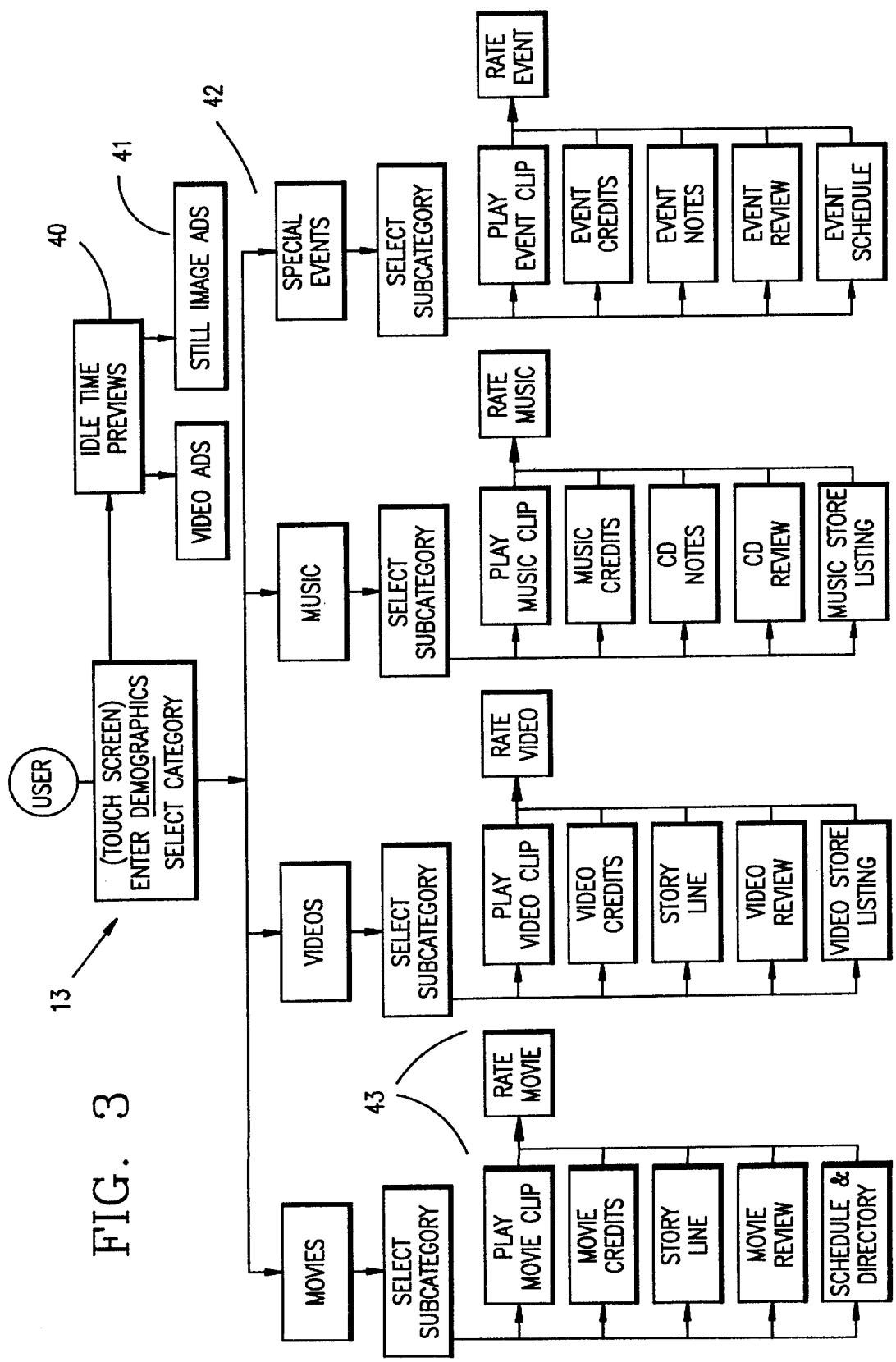
FIG. 3 is a schematic block diagram of the general system functionality hereof.

FIG. 3 illustrates the general system functionality. During idle time when the kiosk 13 is not being operated by a user, movie previews or other desired graphics are sequentially continuously displayed on the touch screen. For instance, previews of coming attractions and/or features currently playing could be continuously run, as at 40, with periodic interruptions to display either still image or video advertising material 41 for other goods and services. For instance, the system can be programmed to distinguish between coming attractions and films currently playing, and can be set up to play a trailer of coming attractions for a duration of only about thirty seconds, for example, and then be triggered by some event, such as the date when the film begins playing at local theaters, to change to a longer trailer or preview, e.g., two minutes. The monitor or screen will continuously display a suitable icon or "button" which the user may touch to initiate operation of the system, which initially displays graphics asking for predetermined demographic information related to that user. After the user has answered the questions related to demographics by touching appropriate icons, the system will display on the touch screen the major categories or databases 42 included in the system, i.e., movies, videos, music and special events. If the user then touches the "movies" icon, for example, a list of movies appearing, and/or coming attractions, will be displayed. The user may select one of the movies by touching the appropriate icon on the screen, and a list of sub-categories 43 relating to the selected movie will then be displayed for selection by the user. These sub-categories could include, for example, a clip or preview of the movie, movie credits, movie storyline, a review or reviews of the movie, and a schedule of time and places where the movie is playing. By touching the appropriate icon for one the sub-categories, the user can then view that material.

Icons of the other major categories and the sub-categories within that one selected are continuously displayed on the screen in a reduced format, so that the user can at any time interrupt the category or sub-category then being viewed and select another. "Forward" and "back" arrows can also be used to enable the user to easily navigate through the system.

Following a preview of the selected category and associated subcategories, graphics appear on the screen asking the user to rate the material that was viewed. This may be done by touching icons on the screen representative of various ratings that could be given to that material.

The screen displays of the invention are intuitive and provide very simple navigation via the use of appropriate graphics on the screen, which can simply be touched by the user to select various categories to move through the system. Further, the system may be programmed to display a selected category, i.e., a movie clip or music selection or video to be displayed for a predetermined period of time ranging from about 30 seconds up to about 2 minutes, or other desired time, although as noted previously the display can be interrupted at any time by the user touching an appropriate icon on the screen.

Figure 4A:
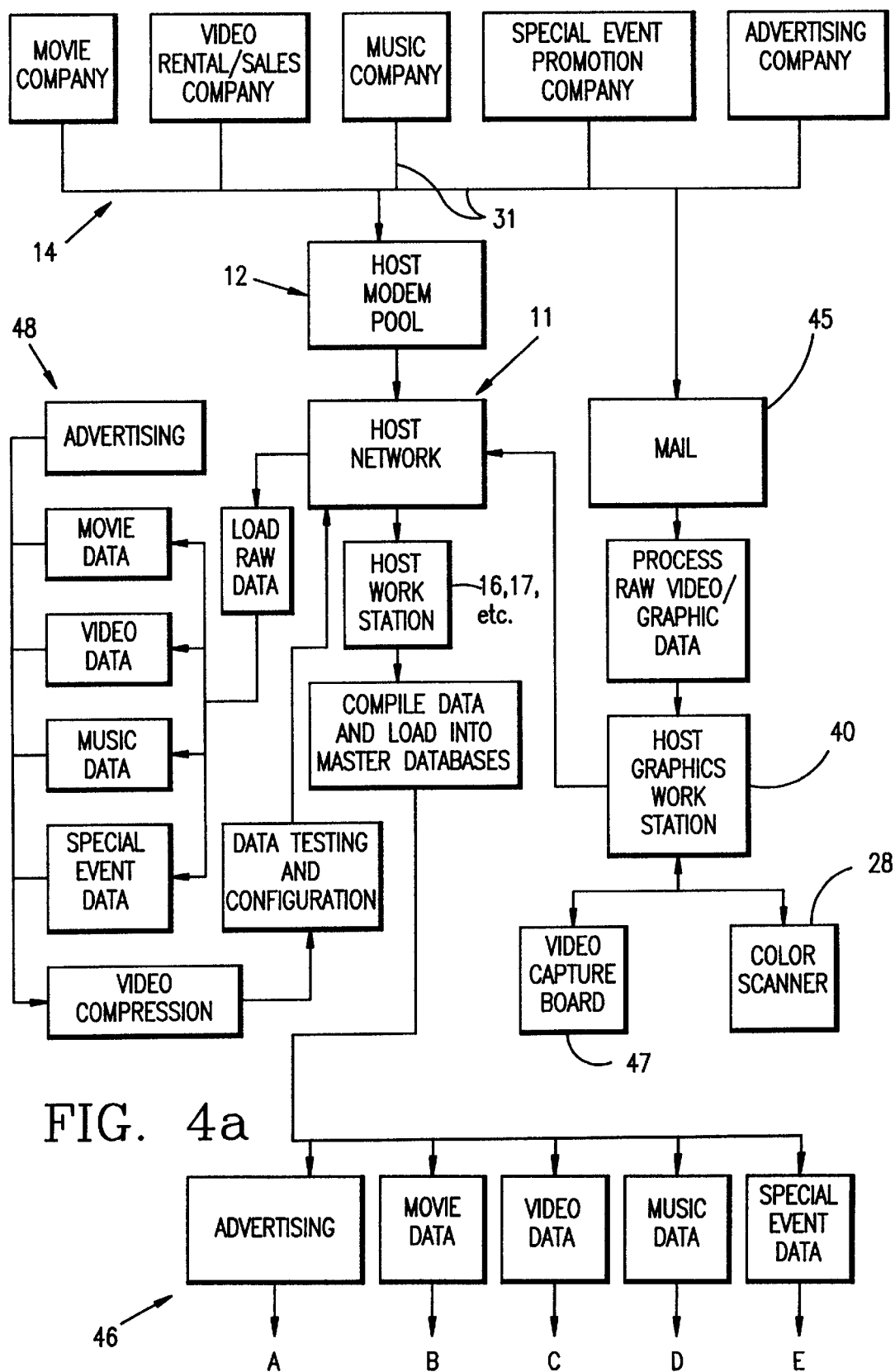
FIGS. 4a and 4a are schematic block diagrams of the general system process thereof.
Figure 4B:
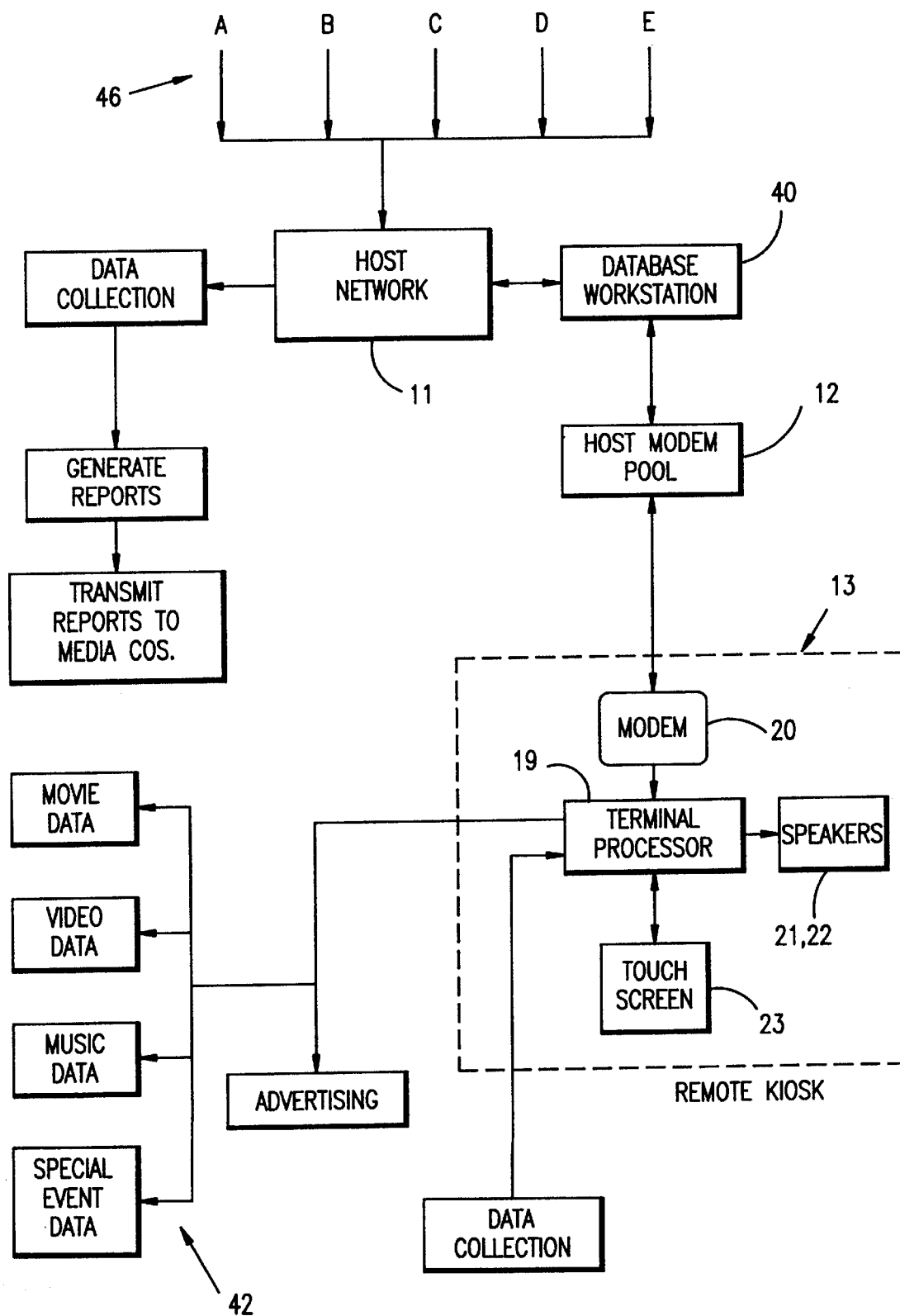

The general process design of the system of the invention is schematically represented in FIGS. 4a and 4b. As seen in FIG. 4a, data from the various media companies 14 may be transmitted to the host network 11 via a telecommunications system 31 and the host modem pool 12, or in a variety of other ways, including via U.S. Mail 45 or other delivery device (not shown). Information transmitted via the host modem pool will already be in a working digitized format and can be compiled by the host work stations 16, 17, etc., and loaded into master databases 46 representative of the various major categories of data to be made available at the remote kiosks.

Videos, photographs, text and other material received in a non-digitized format can be suitably digitized by using the color scanner 28 and/or video capture board 47, or by manual entry, depending upon the nature of the material received, and loaded into the host network for further processing. For instance, raw data representative of the various categories will be loaded into various files 48 for further processing, i.e., graphics will be compressed using conventional video compression techniques, the data appropriately configured and tested and then compiled and loaded into the master databases 46.

With reference to FIG. 4b, the master databases 46 are then transmitted via the database work station 40 and host modem pool 12 to the remote kiosk modem 20 and processor 19, where the data is available for access by the user through the touch screen 23.

Data collected at the remote kiosk can be transmitted back through the modem pool to the host network for appropriate collection and used to generate reports or other files, as desired, and then transmitted to the media companies.

Figure 5:
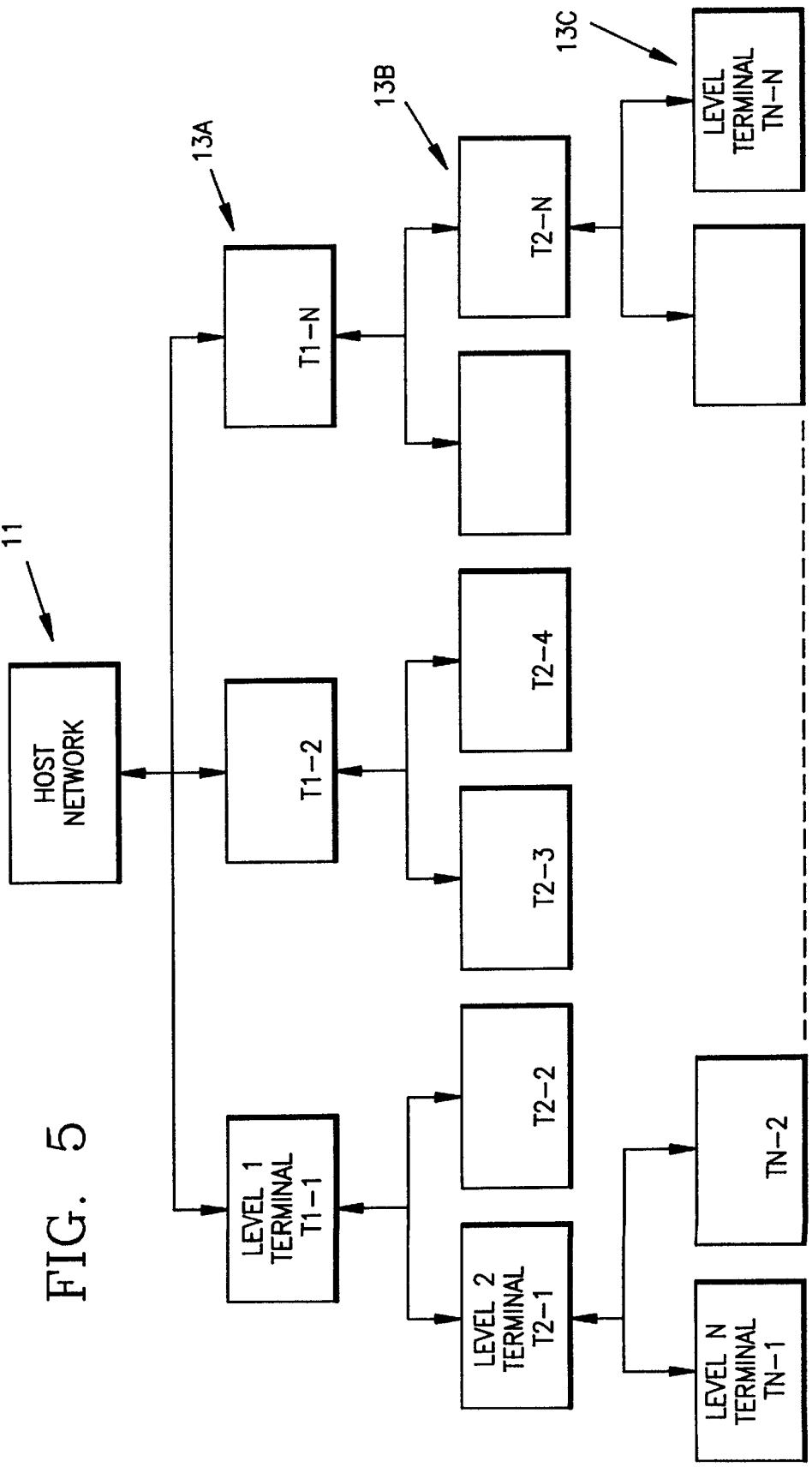
FIG. 5 is schematic block diagram of a variation of the invention, wherein a pyramid scheme is utilized for accessing a large number of kiosks that are coupled to the host network through multiple kiosk levels.

FIG. 5 schematically illustrates the possible pyramid arrangement which can be utilized to increase the speed and ease with which data can be transmitted from the host network 11 to a large number of remote kiosks. The kiosks 13 in this embodiment of the invention are arranged in different levels 13a, 13b, 13c, etc. Thus, data can be transmitted from the host network 11 to a first level of remote kiosks 13A which would then transmit or forward the data to a next level of kiosks 13B, etc. For instance, the host network could transmit data to ten remote kiosks, for example, in level 13A, and each of the kiosks in that level could retransmit the data to an additional ten kiosks, etc.

Information may be transmitted from the host network to the remote kiosks at any suitable time, e.g., during off hours, and at any suitable frequency, i.e., daily, weekly, etc. Moreover, transmittal of data from the host network to the kiosks and retrieval of data by the host network from the remote kiosks can be automatically accomplished based on a preprogrammed date and time, or under manual control at any other time, or by other means, as desired.

Once the data has been suitably processed by the host network and transmitted to the remote kiosks, the remote kiosks are essentially self contained or stand alone in that they do not remain on-line to receive data for access by the user. In other words, once the data is loaded into the processor of the remote kiosks, it is available for access at any time by a user, and may be updated as necessary from the remote kiosk network. Further, the host network and remote kiosk systems may include suitable commercially available equipment, such as remote power on/off by Server Technologies, Inc., so that the remote computers can be restarted from the host, thereby enabling the system to be reset from the host.

Daily maintenance of the system of the invention is accomplished by remote system shutdown on a nightly basis at some predetermined time, e.g. 11:00 pm. System shutdown occurs automatically under control of the operating program, and during shutdown, i.e., from about 11:00 pm to about 8:00 am, for example, the operating program automatically starts a screen saver mode which may comprise a company logo or still advertising or the like. Upon shutdown, the remote terminal dials the host network and transmits daily statistics over the modem. The statistics may relate, for example, to the number and sequence of viewings by users at the remote terminal, to a rating that is given to the material viewed by a user, and other data identifying the movie, music, video clip, or the like that is accessed by a user.

Following transmission of the data, both the host and remote terminal confirm the transmission of the data. The host network also searches the data at the remote terminal for expired film clips, etc., and deletes any outdated material.

The host generates a daily report of the information received from the remote terminals, including identification of remote stations that did not transfer any information or did not transmit data indicating low usage. The host then investigates potential problems in response to a triggering event. If a remote terminal computer locks up or appears to be locked up, the host initiates actuation of the remote power on/off by Server Technologies, Inc. to turn off and restart the remote computer. If the remote computer is still non-functional following this rebooting step, a service technician may be required to visit the site. If it is necessary to shut down and restart a remote terminal during the period following the shut down time and before the start up time, the remote terminal will automatically go into its screen saver mode. If shut down and restarting of the remote computer occurs after the start up time and before the shut down time, then the application will start.

The database and film clip update can occur on any desired schedule, but in a preferred system this will occur approximately once per week. The host initiates update of the database to a first line of remote units, and this first line of remote units then transmits the date to a second line, etc. Thus, during the shutdown time when new data and film clips are transmitted to the remote terminals, the remote terminal receiving the data stores the information in an "out box" for delivery to the next line or level of remote terminals the following night or shut down period.

It is contemplated that new preview clips and data will be transmitted to the remote terminals weeks before they are ready to be viewed. The data file that accompanies the video file will include the start date and the stop date or expiration date for the previews that are transmitted. Transfer of this data occurs off hours while the system is in the screen saver mode and the application is not running. Following the transmission, the remote terminal and host will both confirm successful transmission. If a problem occurs during the transmission, the host will report on it, and the host operator can try to manually send the data the following night.

The operating program for the system automatically incorporates the new data into the application at each remote terminal, so that it is ready for use when the system starts up the following day. The application will not access the data if the start date for that particular data, e.g., film clip, has not arrived.

In other words, the data becomes fully accessible to the system only when the start date is reached.

This entire process is automated and may utilize any suitable system capable of accomplishing the desired result. For example, the data may be stored in an Oracle data base.

While particular embodiments of the invention have been illustrated and described in detail herein, it should be understood that various changes and modifications may be made to the invention without departing from the spirit and intent of the invention as defined by the scope of the appended claims.

What is claimed is:

1. A system for previewing different types of entertainment events, including movie films, video tapes, music selections, and other data, comprising:

host data processing means having means for receiving data related to said entertainment events from one or more sources and processing the data into a predetermined digitized format, means for loading the processed data into information-specific databases each containing information related to a particular type of entertainment event, and means for transmitting the data at predetermined time intervals to data processing means in at least one remote location for access by a user to the data at the remote location;

display means at the remote location for displaying the data selected by the user, including preview of the movie films and video tapes; and interactive control means operable by the user for seleting only from the remote data processing means the data to be previewed.

2. A system as claimed in claim 1, wherein:

the means at the host data processing means for receiving data from said one or more sources and the means for transmitting the data to said one or more remote locations includes at least one host modem; and a modem is connected to the data processing means at the remote location for sending and receiving data to and from the host modem.

3. A system as claimed in claim 2, wherein:

the remote data processing means, display means, interactive control means, host modem and remote modem are contained within a kiosk.

4. A system as claimed in claim 1, wherein:

said remote location display means and interactive control means comprise a touch screen.

5. A system as claimed in claim 1, wherein:

the display means at the remote location includes speakers for displaying audio data.

6. A system as claimed in claim 1, wherein:

the display means at the remote location includes a video monitor for displaying video images.

7. A system as claimed in claim 1, wherein:

the display means at the remote location includes speakers for displaying audio data, and a video monitor for displaying video images.

8. A system as claimed in claim 7, wherein:

said display means and interactive control means at the remote location comprise a touch screen.

9. A system as claimed in claim 1, wherein:

the host data processing means includes a CPU acting as a file server and at least one CPU networked with the file server CPU and serving as a work station.

10. A system as claimed in claim 9, wherein:

at least one of the host work stations includes a CPU, touch screen monitor and speakers that are a duplicate of the data processing means at the remote location, whereby performance of the kiosk can be duplicated and tested at the host location.

11. A system as claimed in claim 10, wherein:

the display means at the remote location includes speakers for displaying audio data and a video monitor for displaying video images; and said remote location display means and interactive control means comprises a touch screen.

12. A system as claimed in claim 1, wherein:

the remote data processing means, display means and interactive control means are contained within a kiosk.

13. A system as claimed in claim 1, wherein:

there are multiple levels of remote locations, connected with one another so that the host data processing means transmits data to data processing means in at least one remote location in a first level, and the data processing means in that level retransmits data to at least one further remote data processing means in a second level of remote locations.

14. A system as claimed in claim 1, wherein:

there are a predetermined number, from one to N, wherein N is at least 2, of levels of remote locations in a pyramid arrangement, and at least one remote location in each of levels one through N-1 transmits data to multiple remote locations in a subsequent, lower level.

15. A method for previewing different types of entertainment events, including movie films, video tapes, music selections, and other data, comprising the steps of:

using a host data processing means to collect from one or more sources data related to materials to be previewed;

processing the collected data into a predetermined digitized format and loading the processed data into one or more information-specific databases, depending upon the type of entertainment event;

transmitting the data in the databases at predetermined time intervals from the host data processing means to a remote data processing means at one or more remote locations;

accessing the data only in the remote data processing means via a user-actuated interactive interface to view selected data previously transmitted to the remote location from the host data processing means, including preview of movie films and video tapes.

16. A method as claimed in claim 15, wherein:

the user-actuated interface comprises a touch screen.

17. A method as claimed in claim 16, including the step of:

continuously displaying previews of movies on the touch screen at idle times when the system is not being operated by a user.

18. A method as claimed in claim 16, including the step of:

collecting demographic and other data related to the user and/or to the material previewed by means of suitable selection and actuation of answers to questions and/or other options displayed on the touch screen.

19. A method as claimed in claim 18, including the steps of:

transmitting the collected data from the remote location to the host data processing means, and from the host data processing means to one or more of said sources.

20. A method as claimed in claim 15, wherein:

the remote data processing means is contained in a kiosk at the remote location.

21. A method as claimed in claim 15, including the steps of:

re-transmitting the data from at least one said remote location to at least one further remote location.

22. A method as claimed in claim 21, wherein:

the host data processing means transmits data to the data processing means in at least one remote location in a first tier or level of remote locations, and the data processing means in said at least one remote location in the first level of remote locations re-transmits data to at least one further remote data processing means in a second tier or level of remote locations.

23. A method as claimed in claim 21, wherein:

there are a predetermined number, from one to N, wherein N is at least 2, of tiers or levels of remote locations arranged in a pyramid, and each remote location in one level transmits data to multiple remote locations in a subsequent, lower level.

24. A system for previewing movie films, comprising:

host data processing means having means for receiving excerpts of movie films and related information from one or more sources and processing the excerpts and related information into digitized data, means for loading the digitized data into a database, and means for transmitting the digitized data at predetermined time intervals to data processing means in at least one remote location for access to the data by a user at the remote location;

display means at the remote location for displaying the data selected by the user, including video display of the movie film excerpts; and interactive control means operable by the user for selecting only from the remote data processing means the data to be previewed.

25. A method for previewing movies, comprising the steps of:

using a host data processing means to collect from one or more sources data related to movies to be previewed, including excerpts of the movies;

processing the collected data into a predetermined digitized format and loading the processed data into an information-specific database;

transmitting at predetermined time intervals the data in the database from the host data processing means to a remote data processing means at one or more remote locations;

accessing only the data in the remote data processing means via a user-actuated interactive interface to view selected data previously transmitted to the remote location from the host data processing means, including video of the movie excerpts.

26. A method of previewing movies, comprising the steps of:

sending to a host data processing means data related to movies, including video excerpts from the movies, movie credits, movie story lines, movie reviews, and a schedule and directory of times and locations where the movies can be seen;

processing the data into a digitized format and loading the processed data into a database;

transmitting at predetermined time intervals the data in the database from the host data processing means to a remote data processing means at a remote location; and accessing only the data in the remote data processing means via an interactive user-actuated interface to view selected data previously transmitted to the remote data processing means, including video of the excerpts from the movies, movie credits, movie story lines, movie reviews, and the schedule and directory of times and locations where the movies can be seen.

* * * * *